United States Patent
Liao et al.

(10) Patent No.: US 7,830,156 B2
(45) Date of Patent: Nov. 9, 2010

(54) METHOD FOR MEASURING VELOCITY OF CONDUCTOR PRESSING ON CAPACITIVE SENSOR

(75) Inventors: Tung-Tsai Liao, Hsin Chu (TW); Li Sheng Lo, Hsin Chu County (TW)

(73) Assignee: Generalplus Technology Inc., Hsin-Chu (TW)

( * ) Notice: Subject to any disclaimer, the term of this patent is extended or adjusted under 35 U.S.C. 154(b) by 146 days.

(21) Appl. No.: 11/984,783

(22) Filed: Nov. 21, 2007

(65) Prior Publication Data

US 2009/0021241 A1    Jan. 22, 2009

(30) Foreign Application Priority Data

Jul. 19, 2007   (TW)  ................ 96126285 A

(51) Int. Cl.
  *G01R 27/26*   (2006.01)
  *G06F 3/044*   (2006.01)
  *H03K 17/94*   (2006.01)
(52) U.S. Cl. .................. 324/678; 324/676; 345/174; 178/18.06; 178/19.03; 341/33
(58) Field of Classification Search ............... 324/678
See application file for complete search history.

(56) References Cited

U.S. PATENT DOCUMENTS

| | | | | |
|---|---|---|---|---|
| 3,703,300 A | * | 11/1972 | Gillund et al. | 280/735 |
| 4,980,519 A | * | 12/1990 | Mathews | 178/19.01 |
| 5,189,377 A | * | 2/1993 | Rhoades et al. | 324/662 |
| 6,204,839 B1 | * | 3/2001 | Mato, Jr. | 345/168 |
| 6,657,614 B1 | * | 12/2003 | Ito et al. | 345/168 |
| 7,315,793 B2 | * | 1/2008 | Jean | 702/150 |
| 2006/0071674 A1 | * | 4/2006 | Jean | 324/686 |
| 2006/0198080 A1 | * | 9/2006 | Hawes et al. | 361/311 |
| 2007/0229466 A1 | * | 10/2007 | Peng et al. | 345/173 |

* cited by examiner

*Primary Examiner*—Timothy J Dole
(74) *Attorney, Agent, or Firm*—Muncy, Geissler, Olds & Lowe, PLLC

(57) ABSTRACT

A method for measuring a velocity of a conductor pressing on a capacitive sensor. The method includes: sampling a capacitance of a sensing electrode at each preset time; providing a threshold value; and determining the velocity of the conductor pressing on the capacitive sensor according to a specific period, wherein the specific period is defined as a period of time ranging from the time when the capacitance reaches the threshold value to the time when the capacitance reaches a peak value.

5 Claims, 6 Drawing Sheets

METHOD FOR MEASURING VELOCITY OF CONDUCTOR PRESSING ON CAPACITIVE SENSOR

This application claims the benefit of the filing date of Taiwan Application Ser. No. "096126285", filed on Jul. 19, 2007, the content of which is incorporated herein by reference.

BACKGROUND OF THE INVENTION

1. Field of the Invention

The present invention relates to a capacitive sensor, and more particularly, to a method for measuring a velocity of a conductor pressing on a capacitive sensor.

2. Description of the Related Art

In recent years, due to the development of technology, control buttons, such as buttons of an elevator or a game console, evolve from a mechanical type of button into a touch sensor. FIG. 1 is a circuit diagram depicting a capacitive touch sensor in the prior art. Referring to FIG. 1, the touch sensor includes a sensing electrode 101, a resistor 102 and a sensing-control terminal 103, wherein the sensing electrode 101 in the circuit is equivalent to a grounding capacitor Cx.

FIG. 2 illustrates an operational waveform diagram of a node A coupled to the sensing electrode 101 and the resistor 102. Referring to FIGS. 1 and 2, the sensing-control terminal 103 charges the node A to a first preset voltage V20 at the beginning, and then the node A is set to high-impedance. Afterward, since the sensing electrode 101 is equivalent to the grounding capacitor Cx, the sensing electrode 101 starts to discharge through the resistor 102. The sensing-control terminal 103 continuously detects a voltage of node A. When the voltage of node A discharges to a second preset voltage V21, the sensing-control terminal 103 determines whether a finger touches the sensing electrode according to a period when the voltage of node A is discharged from the first preset voltage V20 to the second preset voltage, and then the sensing-control terminal 103 begins to charge the node A.

Referring to FIG. 2, the waveform 201 is a voltage waveform of node A when the finger does not touch the sensing electrode 101, and the waveform 202 is a voltage waveform of node A when the finger touches the sensing electrode 101. According to the waveforms, when the finger touches the sensing electrode 101, the equivalent capacitor of the sensing electrode 101 is increased so that a discharge time T2 of the waveform 202 is longer than a discharge time T1 of the waveform 201. Therefore, as long as it is determined that the period when the voltage of node A is discharged from the first preset voltage V20 to the second preset voltage V21 is longer than the discharge time T1 by the sensing-control terminal, it can be determined that the sensing electrode 101 is touched.

However, the conventional capacitive sensor is only applied to the application of detecting whether the sensor is connected with a conductor. The capacitive sensor does not have any other application in the prior art. Due to the development of the industry of the game console, manufacturers have started to find novel game-playing ways and easy operation methods for the game console. Thus, a control method based on the capacitive sensor is provided in the present invention.

SUMMARY OF THE INVENTION

In view of the above-mentioned problems, the present invention is direct to a method for measuring a velocity of a conductor pressing on a capacitive sensor to control a controlled object using this method.

To achieve the above-mentioned object and others, a method for measuring a velocity of a conductor pressing on a capacitive sensor is provided. The method includes the steps of: sampling a capacitance of a sensing electrode at each preset time; providing a threshold value; and determining the velocity of the conductor pressing on the capacitive sensor according to a specific period, wherein the specific period is defined as a period of time ranging from the time when the capacitance reaches the threshold value to the time when the capacitance reaches a peak value or a stable value.

According to the method for measuring the velocity of the conductor pressing on the capacitive sensor in an embodiment of the present invention, the method further comprises the steps of: providing a discharge element, a sensing-control terminal and an input-output control terminal, wherein the discharge element is coupled to and between the sensing-control terminal and the input-output control terminal, and the sensing electrode is coupled to the sensing-control terminal; setting a voltage of the input-output control terminal to a first common voltage and the sensing-control terminal to high-impedance when a voltage of the sensing-control terminal is charged to a first voltage; setting the voltage of the sensing-control terminal to the first common voltage for a preset period and then setting the sensing-control terminal to high-impedance, and setting the voltage of the input-output control terminal to a second common voltage when the voltage of the sensing-control terminal is discharged from the first voltage to a second voltage; charging the sensing-control terminal to the first voltage and then setting the voltage of the input-output control terminal to the first common voltage and then setting the sensing-control terminal to high-impedance when the voltage of the sensing-control terminal is charged from the first common voltage to a third voltage; and determining a value of the capacitance according to a period during which the voltage of the sensing electrode is discharged from the first voltage to the second voltage plus a period during which the voltage of the first sensing electrode is charged from the first common voltage to the third voltage. Thus, the electrostatic influence can be avoided.

The essence of the present invention is to continuously sample and record the capacitance of the sensing electrode, and estimate the velocity of a conductor pressing on the capacitive sensor according to a period from the time when the capacitance reaches a threshold value to the time when the capacitance reaches a peak value or a stable value. Thus, not only a new method for controlling a controlled object is provided, but also a new application for the capacitive sensor is disclosed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

EMBODIMENT OF THE INVENTION

In a specific application, such as toy or game console, to sense a pressure of a conductor, such as a finger, pressing on a capacitive sensor may be required. As for a general conductor, especially a human finger, a pressure of pressing a sensing electrode 101 is direct to the vertical velocity between the conductor and the sensing electrode 101. Thus, a method for measuring a velocity of a conductor pressing on a capacitive sensor is provided in the present invention. A variation of the equivalent capacitance of the sensing electrode with respect to time is utilized to determine a period from the time when a conductor is connected with the sensing electrode 101 to the time when the conductor is disconnected from the sensing electrode 101 for the determination of the pressure of the conductor pressing on the capacitive sensor. In order to make the aforementioned and other objectives, features, and advantages of the present invention comprehensible, preferred embodiments accompanied with figures are described in detail below.

Figure 1:
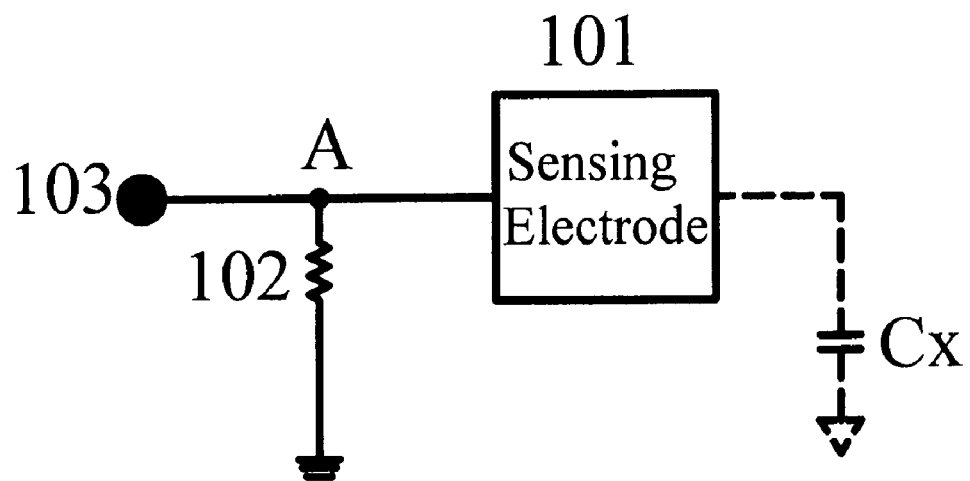
FIG. 1 illustrates a circuit diagram depicting a touch sensor in the prior art.
Figure 2:
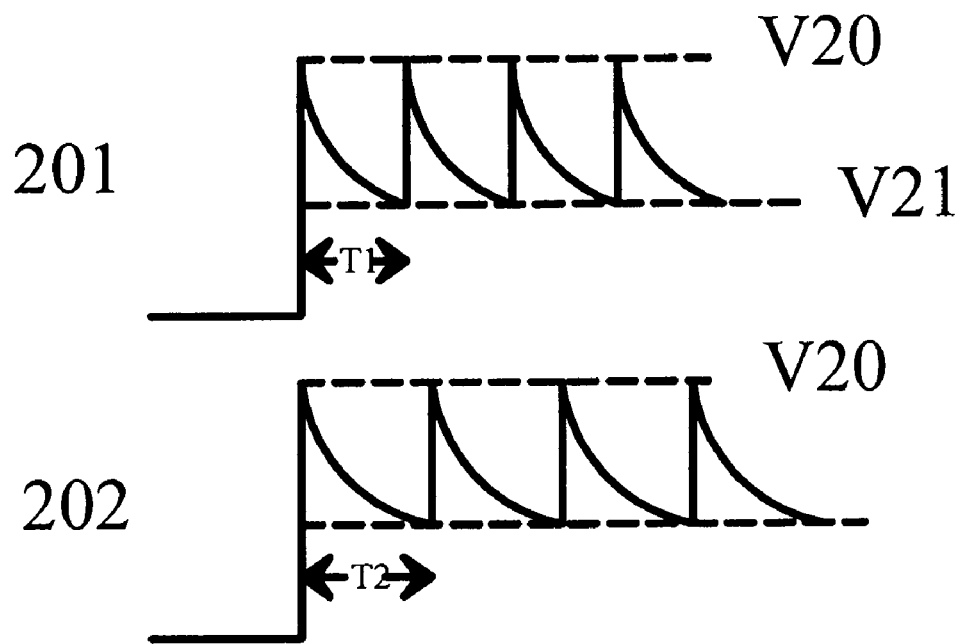
FIG. 2 illustrates an operational waveform diagram of node A coupled to the sensing electrode 101 and the resistor 102 in the prior art.
Figure 3:
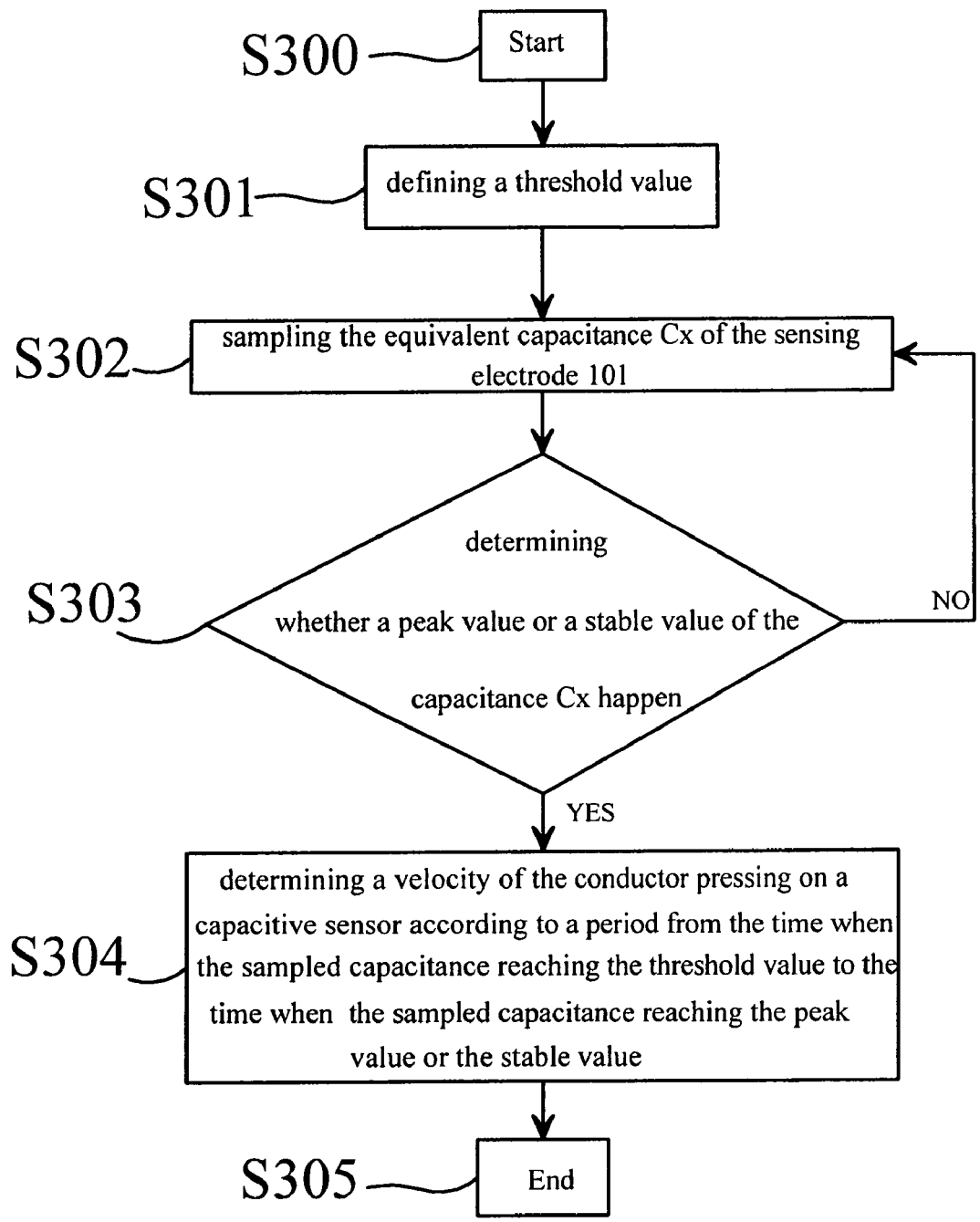
FIG. 3 is a flow chart depicting a method for measuring a velocity of a conductor pressing on a capacitive sensor according to an embodiment of the present invention.
Figure 4:
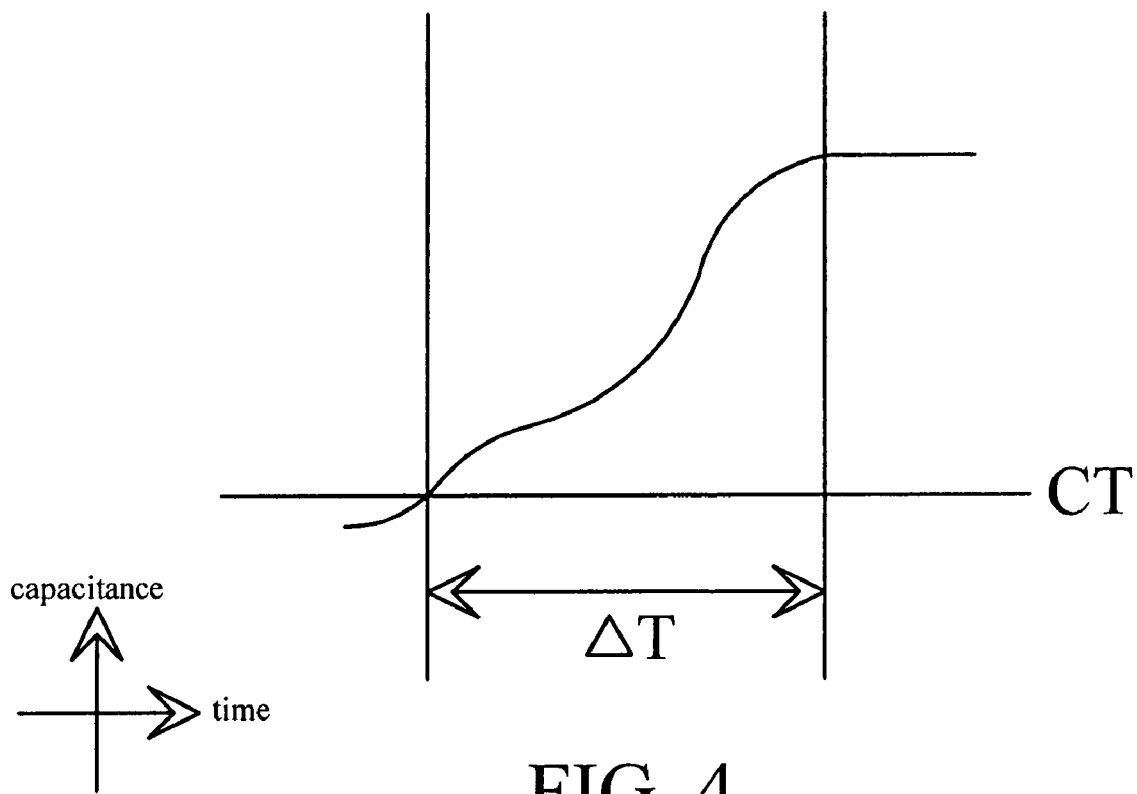
FIG. 4 illustrates a waveform depicting a variation of the capacitance when a conductor presses on the sensing electrode 101 according the embodiment of the present invention.

FIG. 3 is a flow chart depicting a method for measuring a velocity of a conductor pressing on a capacitive sensor according to an embodiment of the present invention. FIG. 4 illustrates a waveform depicting a variation of the capacitance when a conductor pressing on the sensing electrode 101 according an embodiment of the present invention. As for the circuit diagram, please refer to FIG. 1. As shown in FIG. 3, the method includes the following steps.

Step S300: start.

In step S301, a threshold value CT is defined.

In step S302, a value of a capacitance Cx of a sensing electrode 101 is sampled at each preset time. In this step, the sampled capacitance and sampling time will be recorded according its sampled sequence.

In step S303, it is determined whether a peak value or a stable value of the capacitance Cx of the sensing electrode 101 occurs. In simple terms, the peak value is a highest value from rising of the capacitance Cx to falling of the capacitance Cx. One of the methods for determination of the peak value is to compare the former sampled capacitance with the present sampled capacitance. Because a conductor gradually approaches the sensing electrode 101, its equivalent capacitance should be gradually increased. If the former sampled capacitance is equal to the present sampled capacitance, it represents that a conductor tightly contacts with the sensing electrode 101. If the former sampled capacitance is larger than the present sampled capacitance, it represents that a conductor tightly contacts with the sensing electrode 101 and starts to leave it. Thus, the peak value or the stable value of the equivalent capacitance of the sensing electrode 101 can be determined in substance as long as it can be determined that the former sampled capacitance is larger than or equal to the present sampled capacitance. If the peak value or the stable value does not occur, the procedure returns to step S302.

Although the abovementioned embodiment in step S303 only treats the former sampled capacitance and the present sampled capacitance as the representative example, one of ordinary skill in the art, who refers to the abovementioned embodiment, should know that more than two sampling operations may be performed to determine whether the peak value or the stable value occurs. Thus, the present invention is not limited to the operation of sampling the capacitance twice.

In step S304, when the equivalent capacitance Cx of the sampled sensing electrode capacitance has a peak value or a stable value, a velocity of the conductor pressing on the capacitive sensor is determined according to a period ΔT from the time when the sampled capacitance reaches the threshold value to the time when the sampled capacitance reaches the peak value or the stable value.

Step S305: end.

Since the sampled capacitance and the sampling time are recorded in this embodiment, a time point when the capacitance reaches the threshold value can be obtained as long as the peak value of the capacitance is sampled, wherein the time point can be considered as a time point when the conductor starts to approach the sensing electrode. Therefore, as long as it is determined that the sampled capacitance reaches the peak value or the stable value, the velocity of the conductor pressing on the capacitive sensor can be determined according to the time point when the capacitance reaches the threshold value and the time point when the capacitance reaches the peak value or the stable value.

Figure 5:
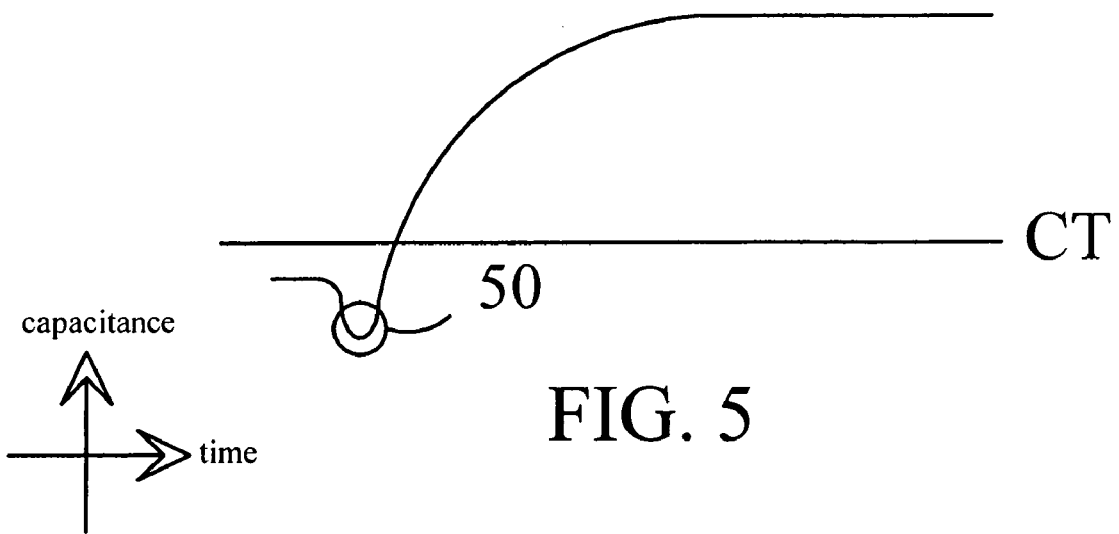
FIG. 5 illustrates a waveform depicting the variation of the equivalent capacitance of the sensing electrode 101 when a conductor having electrostatic charges presses on the sensing electrode 101.

The method for measuring the velocity of the conductor pressing on the capacitive sensor is provided in the abovementioned embodiment. However, most of the materials at the connection portion between the sensing electrode and the conductor is made of the plastic material which is easily affected by electrostatic charges. FIG. 5 illustrates a waveform depicting the variation of the equivalent capacitance of the sensing electrode 101 when a conductor having electrostatic charge presses on the sensing electrode 101. Referring to FIG. 5, when the electrostatic charges carried by a conductor is just opposite to the charged charges for the sensing electrode 101, the conductor would bring away the charges stored in the equivalent capacitance of the sensing electrode 101. Thus, it is measured that the equivalent capacitance is suddenly decreased, as indicated by the symbol 50 so that the measured force of the conductor for pressing on the capacitive sensor becomes inaccurate. Thereinafter, an embodiment is further provided in the following to avoid the electrostatic influence.

Figure 6:
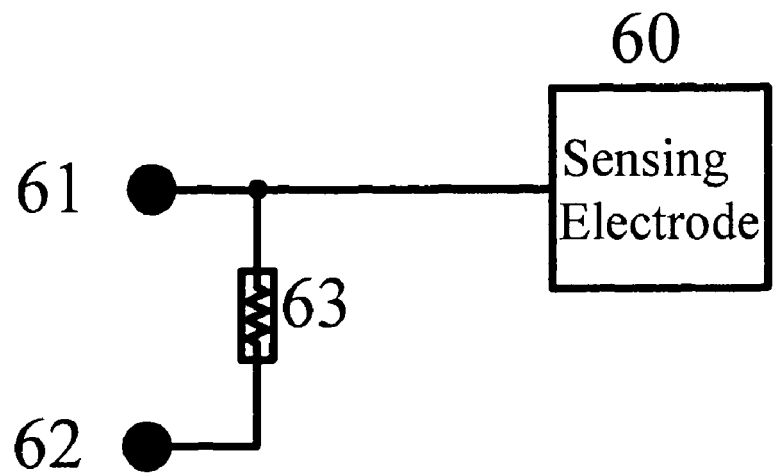
FIG. 6 illustrates a circuit block diagram depicting a capacitive sensor according to the embodiment of the present invention.
Figure 7:
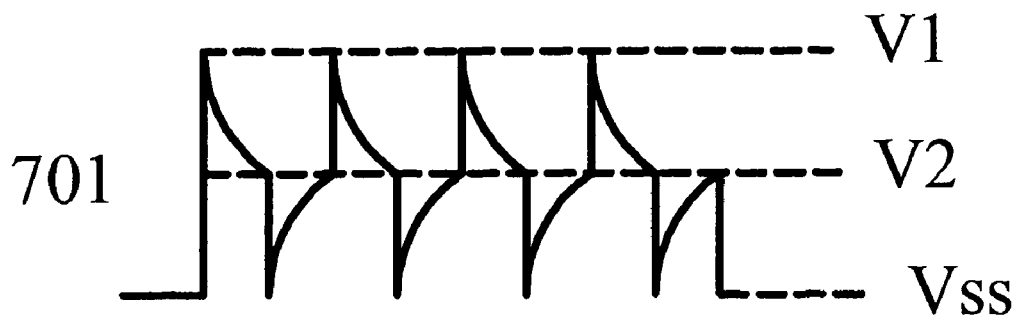
FIG. 7 illustrates the operational waveforms depicting an operation of the capacitive sensor in FIG. 6 according to the embodiment of the present invention.
Figure 7:
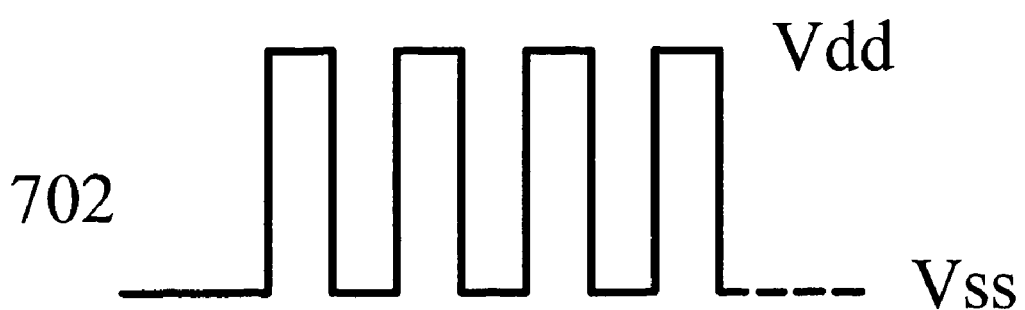
Figure 8:
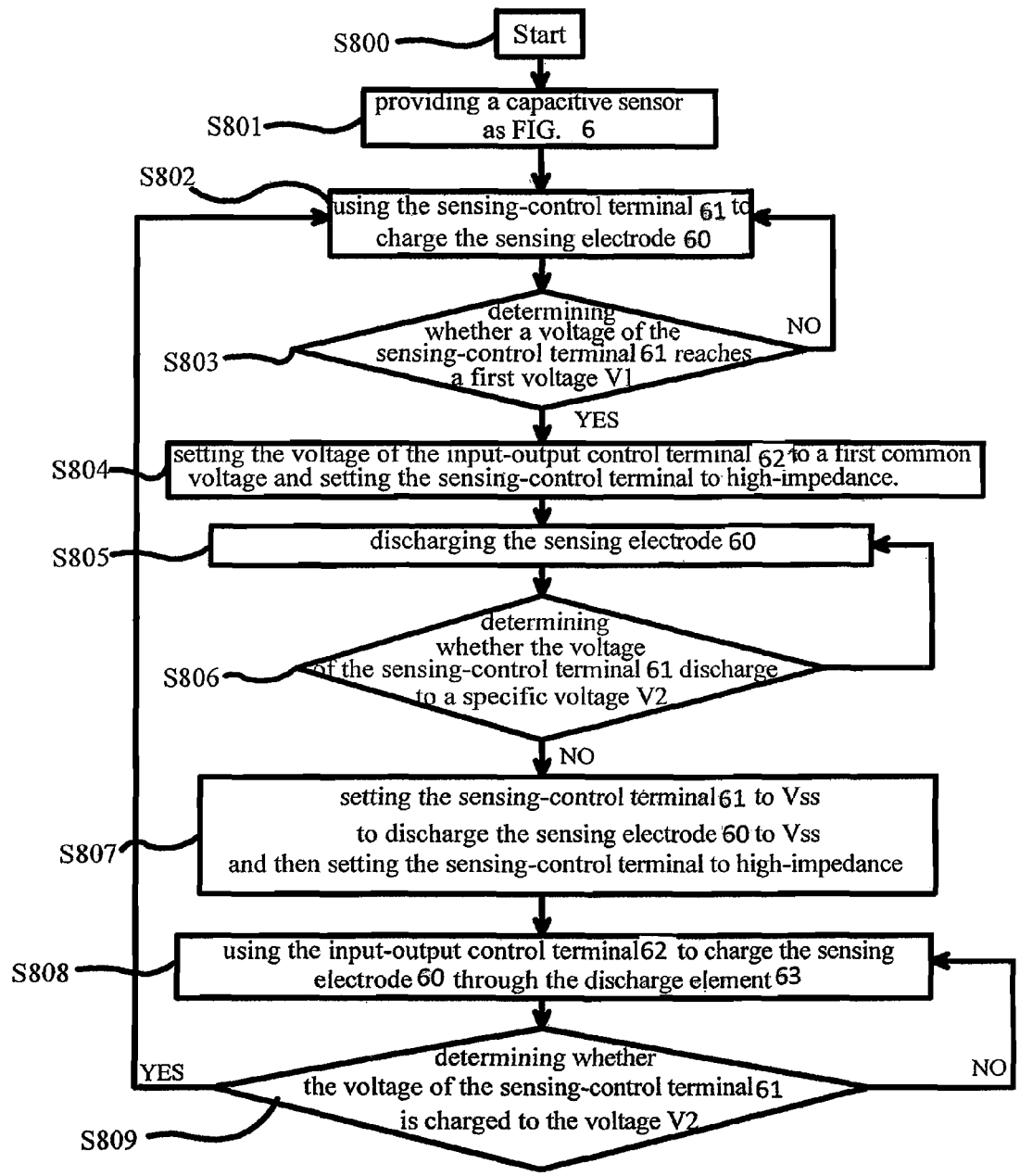
FIG. 8 is a flow chart depicting the operation of the capacitive sensor in FIG. 6 according to the embodiment of the present invention.

FIG. 6 illustrates a circuit block diagram according to the embodiment of the present invention. Referring to FIG. 6, the circuit includes a sensing electrode 60, a sensing-control terminal 61, an input-output control terminal 62, and a discharge element 63. The coupling relationship thereof is shown in FIG. 6. FIG. 7 illustrates the operational waveforms according to the embodiment of the present invention. Referring to FIG. 7, the waveform 701 is the voltage waveform of the sensing-control terminal 61. The waveform 702 is a waveform of the input-output control terminal 62. FIG. 8 is a flow chart depicting the operation of the FIG. 7 according to the embodiment of the present invention. Referring to FIGS. 6, 7 and 8, the method of the invention includes the following steps.

Step S800: start.

In step S801, a capacitive sensor is provided, as shown in FIG. 6.

In step S802, the sensing-control terminal 61 is adopted to charge the sensing electrode 60.

In step S803, it is determined whether a voltage of the sensing-control terminal 61 reaches a first voltage V1. When the determination is negative, the procedure returns to the step S802 to continue to charge the sensing electrode 60.

In step S804, when the voltage of the sensing-control terminal 61 reaches the first voltage V1, the voltage of the input-output control terminal 62 is set to a first common voltage Vss and the sensing-control terminal is set to high-impedance.

In step S805, the sensing electrode 60 discharges the input-output control terminal 62 through the discharge element 63.

In step S806, it is determined whether the voltage of the sensing-control terminal 61 is discharged to a specific voltage V2. When the determination is negative, the procedure returns to the step S805 to continue to discharge the sensing electrode 60.

In step S807, when the voltage of the sensing-control terminal 61 is discharged to the specific voltage V2, the sensing-control terminal 61 is set to the first common voltage Vss to discharge the sensing electrode 60 to the common voltage Vss. Afterward, the sensing-control terminal 61 is set to high-impedance. In addition, the input-output control terminal 62 is set to the second common voltage Vdd.

In Step S808, the input-output control terminal 62 is adopted to charge the sensing electrode 60 through the discharge element 63.

In step S809, it is determined whether the voltage of the sensing-control terminal 61 is charged to the voltage V2. When the voltage of the sensing-control terminal 61 reaches the voltage V2, the procedure returns to the step S802.

Since the equivalent capacitance of the sensing-electrode 60 will not be changed when the sensing electrode 60 is not touched, the voltage waveform measured at sensing-control terminal 61 is a periodic waveform. When the sensing electrode 60 is touched by a conductor, the equivalent capacitance of the sensing electrode 60 will be increased, and the period of the voltage waveform measured at sensing-control terminal 61 will be increased. Thus, the variation of the equivalent capacitance of the sensing electrode 60 can be determined according to the period and its voltage variation which are obtained in the step S802 to S809.

Although the embodiment is illustrated utilizing FIGS. 6, 7 and 8 as the example, one of ordinary skill in the art should understand the above-mentioned voltages V1, V2, Vss and Vdd can be changed according to different situations. In one general situation, the common voltage Vdd is a power supply voltage, and the common voltage is a ground voltage. In addition, the charged target for the sensing electrode 60 needs not to be chosen as the voltage V2. Thus, the present invention is not limited to the abovementioned voltages. In addition, the discharge element 63 is generally implemented by a resistor or its equivalent element.

Figure 9A:
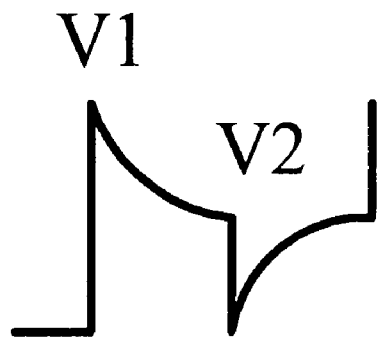
FIG. 9A illustrates an operational waveform diagram when the sensing electrode has no charge according to the embodiment of the present invention.
Figure 9B:
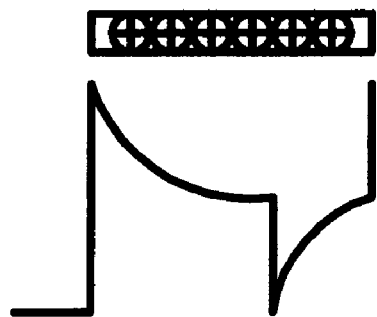
FIG. 9B illustrates an operational waveform diagram when the sensing electrode has positive charges according to the embodiment of the present invention.
Figure 9C:
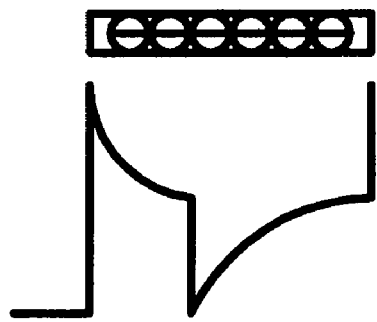
FIG. 9C illustrates an operational waveform diagram when the sensing electrode has negative charges according to the embodiment of the present invention.

FIGS. 9A to 9C respectively represent operational waveforms when the sensing electrode 60 has no charge, positive charges and negative charges according to the embodiment of the present invention. Referring to FIGS. 9A and 9B, when a surface of the sensing electrode 60 has the positive charges, the period during which the voltage of the sensing electrode 60 is discharged from the voltage V1 to the voltage V2 will be lengthened, but the period during which the voltage of the sensing electrode 60 is charged from the common voltage Vss to the voltage V2 will be comparatively shortened. Next, as shown in FIGS. 9A and 9C, when the surface of the sensing electrode 60 has the negative charges, the period during which the voltage of the sensing electrode 60 is discharged from the voltage V1 to the voltage V2 will be shortened, but the period during which the voltage of the sensing electrode 60 is charged from the common voltage Vss to the voltage V2 will be comparatively lengthened. Thus, when the electrostatic charges on the sensing electrode 60 are either positive charges or negative charges, a corresponding charge period or discharge period will be lengthened, and the other charge period or discharge period will be shortened. In other words, when the electrostatic charges on the sensing electrode 60 are either positive charges or negative charges, the sum of its charge period and its discharge period is almost equal to the sum of the charge and discharge periods when there is no electrostatic charge on the sensing electrode 60. Therefore, the circuit and its operation can reduce the error of the estimation of the equivalent capacitance caused by the electrostatic charges. In addition, the estimation of the equivalent capacitance can be more accurate.

To sum up, the essence of the present invention is to continuously sample and record the capacitance of the sensing electrode, and then a velocity of a conductor pressing on a capacitive sensor is estimated according to a period from the time when the capacitance overtakes a threshold value to the time when the capacitance reaches a peak value or a stable value. Hence, a new control method is developed and a new application for the capacitive sensor is provided. For example, the conventional electrical pet only has one reaction when being touched. However, if the present invention is used, the electrical pet can have different reactions, such as a purring reaction or a moaning reaction according to the pressure of touching. Thus, the competitive ability of the toy manufacturer can be promoted when the present invention is adopted. In the other aspect, the preferring embodiment depicted at FIGS. 6 to 8 can be used to avoid the influence of the electrostatic charges so that the velocity of the conductor pressing on the capacitive sensor can be more accurately estimated.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for measuring a velocity of a conductor pressing on a capacitive sensor, the method comprising:

defining a threshold value; and sampling a value of a capacitance of a sensing electrode;

judging a first time point when a first sampled value of the capacitance of the sensing electrode is larger than the threshold value;

judging a second time point when a second sampled value of the capacitance reaches a peak value or a stable value;

calculating a time period from the first time point to the second time point; and calculating a change in capacitance between the first sampled capacitance and the second sampled capacitance; and determining the velocity of the conductor pressing on a capacitive sensor according to the change in capacitance and the time period.

2. The method according to claim 1, further comprising:

providing a discharge element, a sensing-control terminal and an input-output control terminal, wherein the discharge element is coupled between the sensing-control terminal and the input-output control terminal, and the sensing electrode is coupled to the sensing-control terminal;

setting a voltage of the input-output control terminal to a first common voltage and the sensing-control terminal to high-impedance when a voltage of the sensing-control terminal is charged to a first voltage;

setting the voltage of the sensing-control terminal to the first common voltage for a preset period and then setting the sensing-control terminal to high-impedance, and setting the voltage of the input-output control terminal to a second common voltage when the voltage of the sensing-control terminal is discharged from the first voltage to a second voltage;

charging the sensing-control terminal to the first voltage and then setting the voltage of the input-output control terminal to the first common voltage and then setting the sensing-control terminal to high-impedance when the voltage of the sensing-control terminal is charged from the first common voltage to a third voltage; and determining the value of the capacitance according to a period during which the voltage of the sensing-control terminal is discharged from the first voltage to the second voltage plus a period during which the voltage of the sensing-control terminal is charged from the first common voltage to the third voltage.

3. The method according to claim 2, wherein the first common voltage is a ground voltage.

4. The method according to claim 2, wherein the second voltage and the third voltage are between the first voltage and the first common voltage.

5. The method according to the claim 2, wherein the discharge element is a resistor.

* * * * *